(12) United States Patent
Imamoto

(10) Patent No.: US 9,594,915 B2
(45) Date of Patent: Mar. 14, 2017

(54) INFORMATION PROCESSING APPARATUS

(71) Applicant: CANON KABUSHIKI KAISHA, Tokyo (JP)

(72) Inventor: Yoshiharu Imamoto, Pittsburgh, PA (US)

(73) Assignee: Canon Kabushiki Kaisha, Tokyo (JP)

( * ) Notice: Subject to any disclaimer, the term of this patent is extended or adjusted under 35 U.S.C. 154(b) by 739 days.

(21) Appl. No.: 13/958,855

(22) Filed: Aug. 5, 2013

(65) Prior Publication Data

US 2014/0068276 A1    Mar. 6, 2014

(30) Foreign Application Priority Data

Aug. 29, 2012   (JP) .................................. 2012-188926

(51) Int. Cl.
   *G06F 21/62*   (2013.01)
   *G06F 21/60*   (2013.01)
   *G06F 21/79*   (2013.01)

(52) U.S. Cl.
   CPC ........ *G06F 21/602* (2013.01); *G06F 21/6209* (2013.01); *G06F 21/79* (2013.01)

(58) Field of Classification Search
   None
   See application file for complete search history.

(56) References Cited

U.S. PATENT DOCUMENTS

| 7,900,059 B2* | 3/2011 | Bade ........................ G06F 21/57 713/190 |
| 2008/0178176 A1* | 7/2008 | Berger ................ G06F 9/45558 718/1 |
| 2009/0089661 A1 | 4/2009 | Imamoto |

OTHER PUBLICATIONS

TPM Main Part 1 Design Principles, Specification Version 1.2, Revision 116, Mar. 1, 2011, TCG Published.
TPM Main Part 2 TPM Structures, Specification Version 1.2, Level 2 Revision 116, Mar. 1, 2011, TCG Published.
TPM Main Part 3 Commands, Specification Version 1.2, Level 2 Revision 116, Mar. 1, 2011, TCG Published.

* cited by examiner

*Primary Examiner* — Benjamin Lanier
(74) *Attorney, Agent, or Firm* — Fitzpatrick, Cella, Harper & Scinto

(57) ABSTRACT

A hardware TPM has a plurality of registers, and performs data protection by encryption of data associated with the value of one of the plurality of registers. A register number manager manages, for each application, a register number used for the data protection. During execution of an application, an application executor issues a data protection request that designates a register number preset in the application. A software TPM transfers, to the hardware TPM, the data protection request in which the register number designated in the data protection request has been replaced with the register number managed by the register number manager.

14 Claims, 20 Drawing Sheets

HARDWARE PCR

| $PCR_1$ | 0x00000000 (INITIAL VALUE) |
|---|---|
| $PCR_2$ | 0x00000000 (INITIAL VALUE) |
| $PCR_3$ | 0x00000000 (INITIAL VALUE) |
| $PCR_4$ | 0x00000000 (INITIAL VALUE) |
| $PCR_5$ | 0x00000000 (INITIAL VALUE) |
| $PCR_6$ | 0x00000000 (INITIAL VALUE) |
| $PCR_7$ | 0x00000000 (INITIAL VALUE) |
| $PCR_8$ | 0x00000000 (INITIAL VALUE) |
| ⋮ | ⋮ |
| $PCR_{16}$ | 0x00000000 (INITIAL VALUE) |

FIG. 2C

HARDWARE PCR

| $PCR_1$ | 0x12345678 (BIOS) |
|---|---|
| $PCR_2$ | 0x23456789 (BOOT LOADER) |
| $PCR_3$ | 0x34567890 (KERNEL) |
| $PCR_4$ | 0x4567890A (SOFTWARE TPM) |
| $PCR_5$ | 0x00000000 (INITIAL VALUE) |
| $PCR_6$ | 0x00000000 (INITIAL VALUE) |
| $PCR_7$ | 0x00000000 (INITIAL VALUE) |
| $PCR_8$ | 0x00000000 (INITIAL VALUE) |
| ⋮ | ⋮ |
| $PCR_{16}$ | 0x00000000 (INITIAL VALUE) |

FIG. 2D

HARDWARE PCR

| $PCR_1$ | 0x12345678 (BIOS) |
|---|---|
| $PCR_2$ | 0x23456789 (BOOT LOADER) |
| $PCR_3$ | 0x34567890 (KERNEL) |
| $PCR_4$ | 0x4567890A (SOFTWARE TPM) |
| $PCR_5$ | 0x567890AA (Apps) |
| $PCR_6$ | 0x567890AB (App1) |
| $PCR_7$ | 0x567890A0 (App2) |
| $PCR_8$ | 0x567890A9 (App3) |
| ⋮ | ⋮ |
| $PCR_{16}$ | 0x00000000 (INITIAL VALUE) |

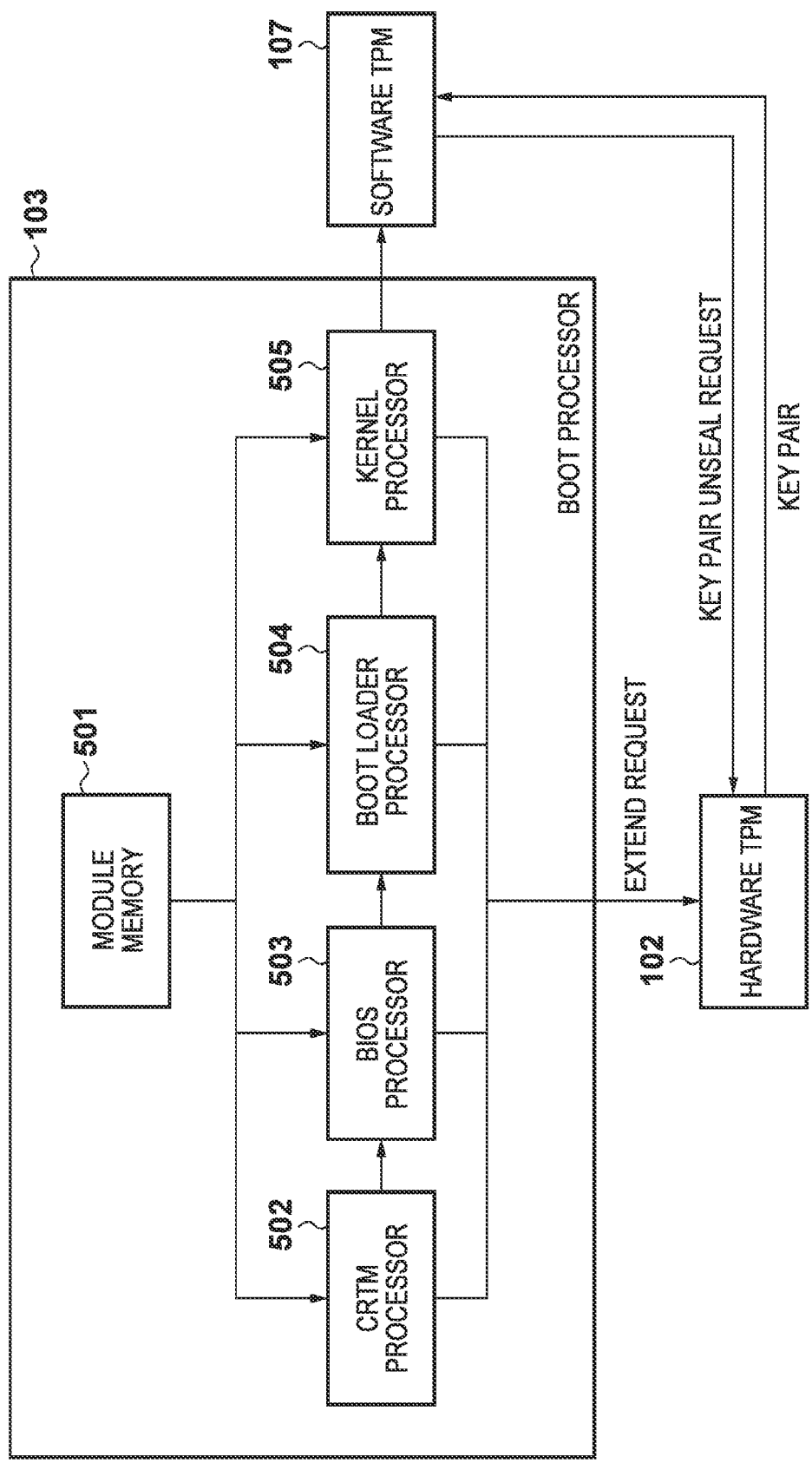

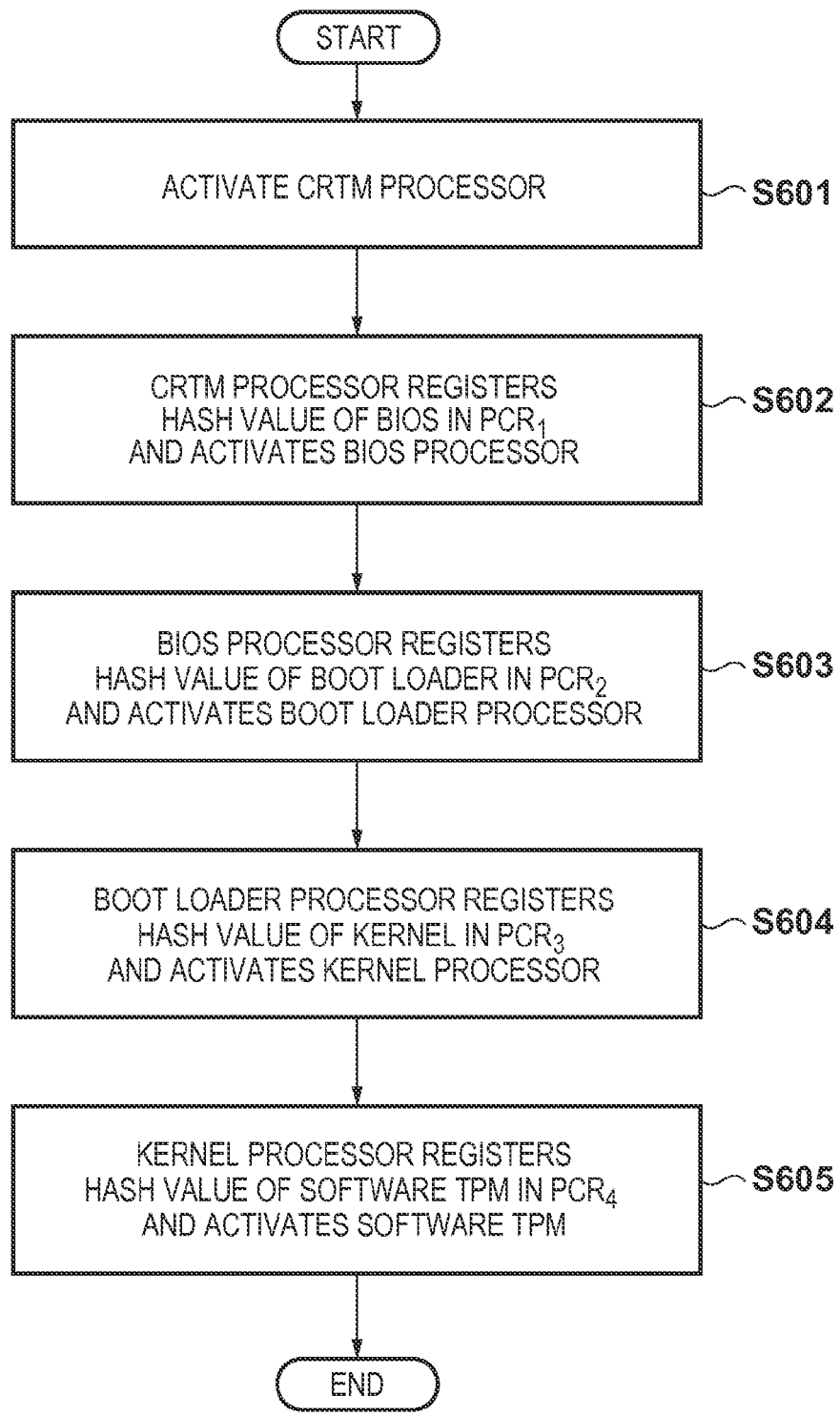

FIG. 5A

| /usr/local/bin/appli1 | $PCR_6$ |
|---|---|
| /usr/local/bin/appli2 | $PCR_7$ |
| /usr/local/bin/appli3 | $PCR_8$ |
| ⋮ | ⋮ |

FIG. 5B

| /usr/local/bin/appli1 | root | $PCR_6$ |
|---|---|---|
| /usr/local/bin/appli1 | user1 | $PCR_7$ |
| /usr/local/bin/appli2 | user1 | $PCR_8$ |
| ⋮ | ⋮ | ⋮ |

FIG. 5C

| 0x12345678 | $PCR_6$ |
|---|---|
| 0x23456789 | $PCR_7$ |
| 0x34567890 | $PCR_8$ |
| ⋮ | ⋮ |

FIG. 5D

| http://example.org/appli1 | $PCR_6$ |
|---|---|
| http://example.org/appli2 | $PCR_7$ |
| http://example.org/appli3 | $PCR_8$ |
| ⋮ | ⋮ |

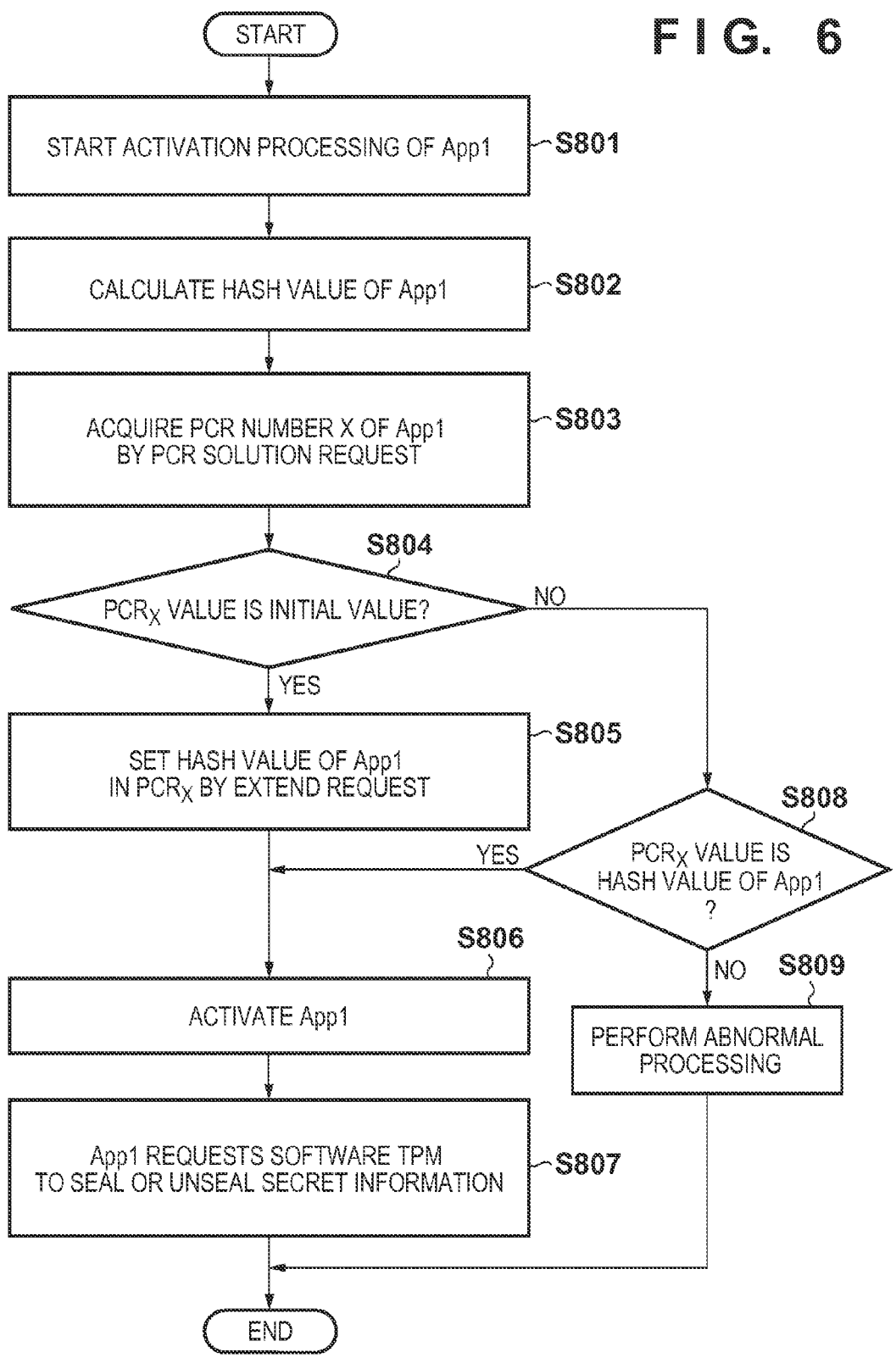

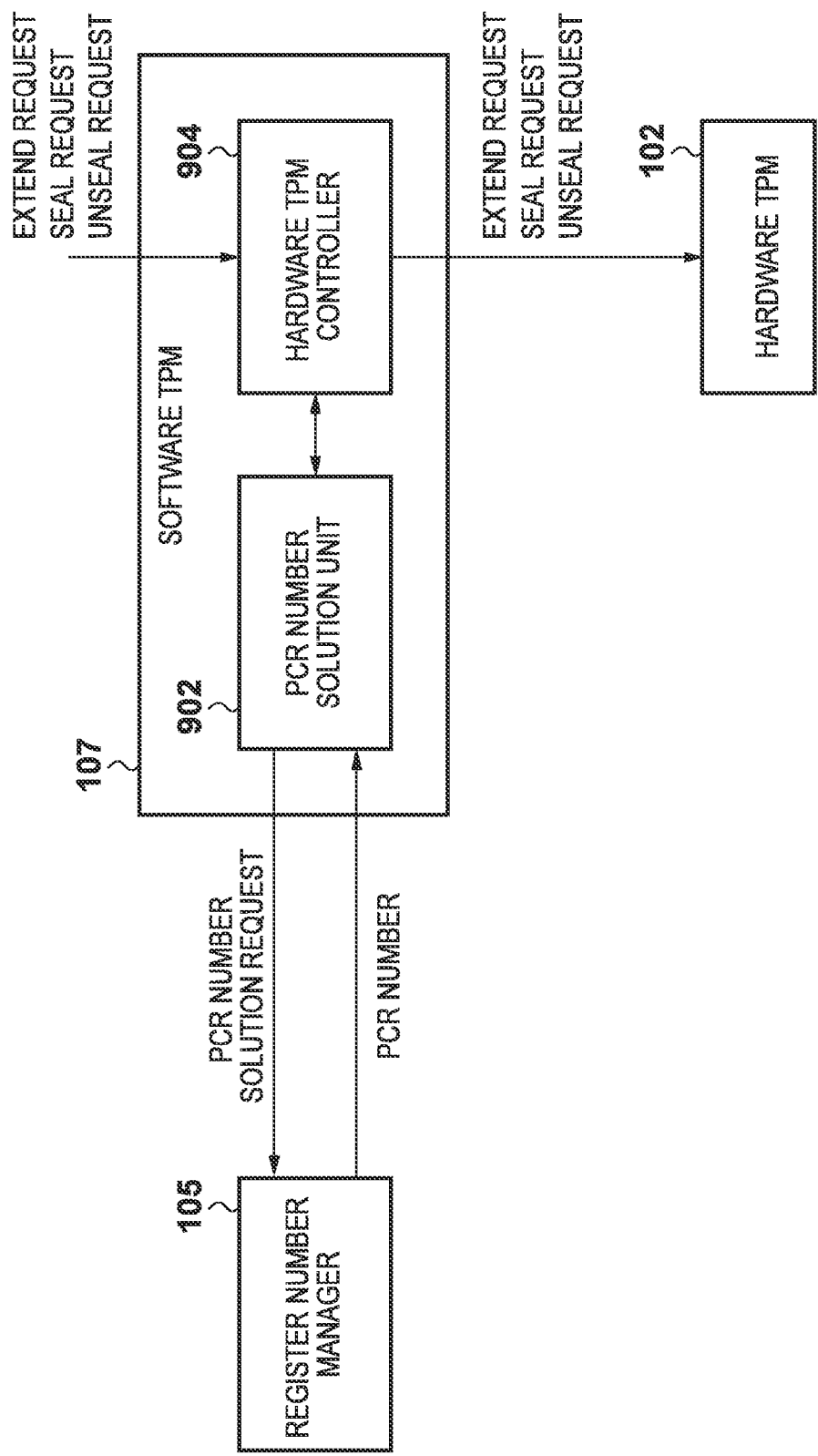

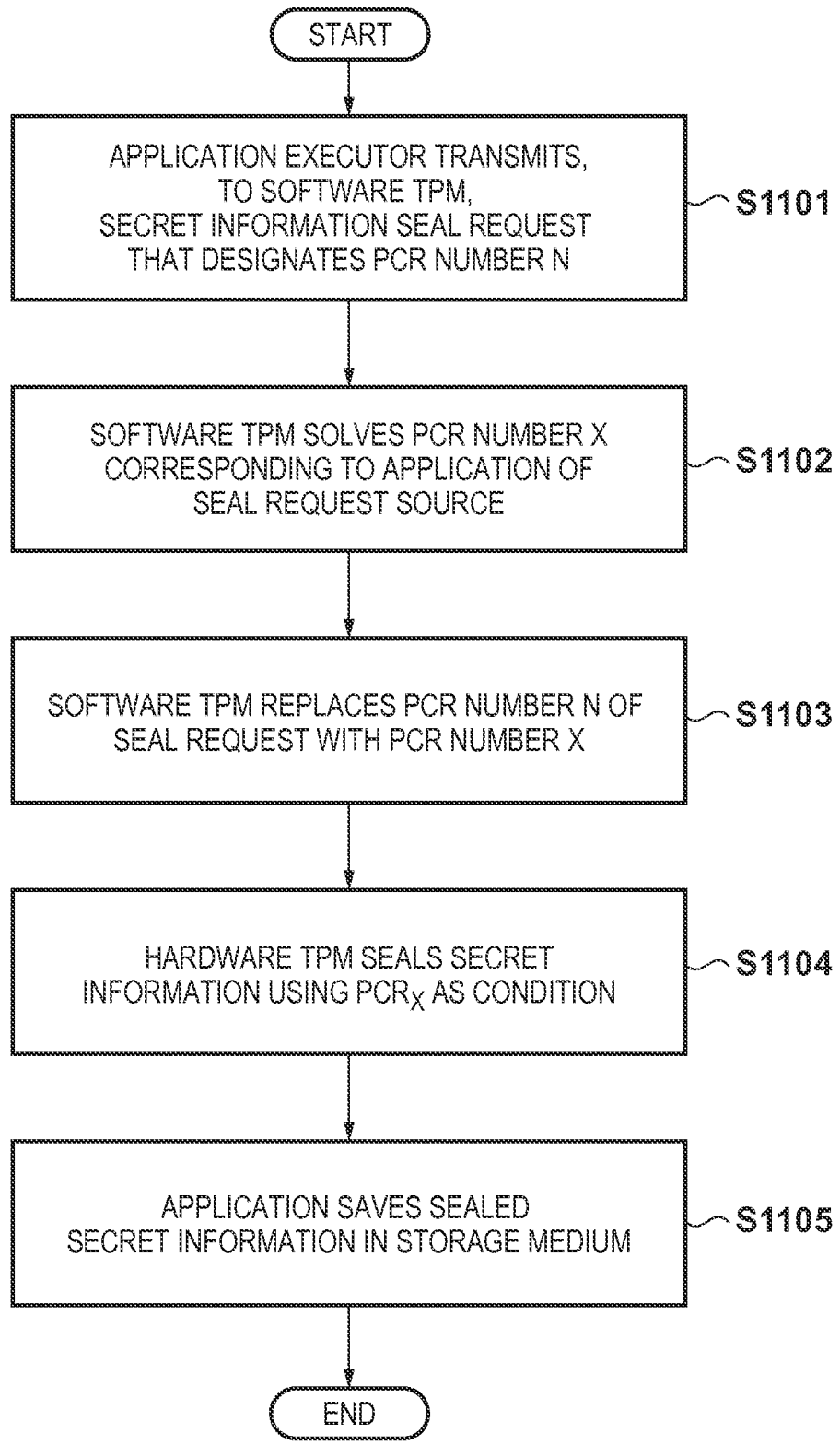

F I G. 12A

PCR OF HARDWARE TPM (HARDWARE PCR)

| $PCR_1$ | 0x00000000 (INITIAL VALUE) |
|---|---|
| $PCR_2$ | 0x00000000 (INITIAL VALUE) |
| $PCR_3$ | 0x00000000 (INITIAL VALUE) |
| $PCR_4$ | 0x00000000 (INITIAL VALUE) |
| $PCR_5$ | 0x00000000 (INITIAL VALUE) |
| $PCR_6$ | 0x00000000 (INITIAL VALUE) |
| $PCR_7$ | 0x00000000 (INITIAL VALUE) |
| $PCR_8$ | 0x00000000 (INITIAL VALUE) |
| ⋮ | ⋮ |
| $PCR_{16}$ | 0x00000000 (INITIAL VALUE) |

PCR OF SOFTWARE TPM (VIRTUAL PCR)

| $PCR_{100}$ | 0x00000000 (INITIAL VALUE) |
|---|---|
| $PCR_{101}$ | 0x00000000 (INITIAL VALUE) |
| $PCR_{102}$ | 0x00000000 (INITIAL VALUE) |
| $PCR_{103}$ | 0x00000000 (INITIAL VALUE) |
| ⋮ | ⋮ |
| ⋮ | ⋮ |
| ⋮ | ⋮ |
| ⋮ | ⋮ |
| $PCR_{999}$ | 0x00000000 (INITIAL VALUE) |

FIG. 12B

PCR OF HARDWARE TPM (HARDWARE PCR)

| $PCR_1$ | 0x12345678 (BIOS) |
|---|---|
| $PCR_2$ | 0x23456789 (BOOT LOADER) |
| $PCR_3$ | 0x34567890 (KERNEL) |
| $PCR_4$ | 0x4567890A (SOFTWARE TPM) |
| $PCR_5$ | 0x00000000 (INITIAL VALUE) |
| $PCR_6$ | 0x00000000 (INITIAL VALUE) |
| $PCR_7$ | 0x00000000 (INITIAL VALUE) |
| $PCR_8$ | 0x00000000 (INITIAL VALUE) |
| ⋮ | ⋮ |
| $PCR_{16}$ | 0x00000000 (INITIAL VALUE) |

PCR OF SOFTWARE TPM (VIRTUAL PCR)

| $PCR_{100}$ | 0x00000000 (INITIAL VALUE) |
|---|---|
| $PCR_{101}$ | 0x00000000 (INITIAL VALUE) |
| $PCR_{102}$ | 0x00000000 (INITIAL VALUE) |
| $PCR_{103}$ | 0x00000000 (INITIAL VALUE) |
| ⋮ | ⋮ |
| ⋮ | ⋮ |
| ⋮ | ⋮ |
| ⋮ | ⋮ |
| ⋮ | ⋮ |
| $PCR_{999}$ | 0x00000000 (INITIAL VALUE) |

FIG. 12C

PCR OF HARDWARE TPM (HARDWARE PCR)

| $PCR_1$ | 0x12345678 (BIOS) |
|---|---|
| $PCR_2$ | 0x23456789 (BOOT LOADER) |
| $PCR_3$ | 0x34567890 (KERNEL) |
| $PCR_4$ | 0x4567890A (SOFTWARE TPM) |
| $PCR_5$ | 0x567890AA (Apps) |
| $PCR_6$ | 0x00000000 (INITIAL VALUE) |
| $PCR_7$ | 0x00000000 (INITIAL VALUE) |
| $PCR_8$ | 0x00000000 (INITIAL VALUE) |
| ⋮ | ⋮ |
| $PCR_{16}$ | 0x00000000 (INITIAL VALUE) |

PCR OF SOFTWARE TPM (VIRTUAL PCR)

| $PCR_{100}$ | 0x98765432 (App1) |
|---|---|
| $PCR_{101}$ | 0x87654321 (App2) |
| $PCR_{102}$ | 0x76543210 (App3) |
| $PCR_{103}$ | 0x00000000 (INITIAL VALUE) |
| ⋮ | ⋮ |
| ⋮ | ⋮ |
| ⋮ | ⋮ |
| ⋮ | ⋮ |
| $PCR_{999}$ | 0x00000000 (INITIAL VALUE) |

INFORMATION PROCESSING APPARATUS

BACKGROUND OF THE INVENTION

Field of the Invention

The present invention relates to data protection using a trusted device in an information processing apparatus.

Description of the Related Art

There exists a technique of mounting a security chip such as a trusted platform module (TPM) in an information processing apparatus and sealing secret information stored in the information processing apparatus.

The TPM includes a register called a platform configuration register (PCR) which stores safely managed key pairs, an encoding function, and the hash values of modules (binary data) in the information processing apparatus. The information processing apparatus holds the hash values of system modules such as a basic input/output system (BIOS) or a boot loader in the PCR and requests the TPM to seal the secret information. The TPM associates the secret information with a register value (PCR value) in the PCR and encodes the secret information (seal). The secret information (sealed data) sealed by the TPM is unsealed by the TPM only when the PCR value associated at the time of sealing is correct.

If the information processing apparatus is unauthorizedly altered, the correct PCR value cannot be held, and the sealed data cannot be unsealed. This can deal with the risk of unauthorized use of the secret information.

Trusted Computing Group (TCG) has standardized trusted boot processing. According to the trusted boot processing, a system registers the hash values of system modules such as a BIOS, boot loader, and kernel in predetermined PCRs so as to use them for seal of secret information. However, when the system registers, in different PCRs, the hash values of the individual applications to be executed after activation of the system, and the applications seal data using corresponding PCR values, the following problem arises.

Since the standard of TCG does not define PCRs to be used by individual applications, a plurality of applications may use a single PCR. In this case, data protection is not correctly performed.

For example, assume that the hash value of an application App1 is registered in a PCR, and the hash value of another application App2 is also unintentionally registered in the PCR in a state in which the application App1 is using the PCR for data protection. In this case, the PCR value changes to an unauthorized value, and the sealed data of App1 cannot be unsealed.

SUMMARY OF THE INVENTION

In one aspect, an information processing apparatus comprising: a trusted device which has a plurality of registers, and is configured to perform data protection by encryption of data associated with a value of one of the plurality of registers; a management unit configured to manage, for each application, a register number used for the data protection; an application execution unit configured to, during execution of an application, issue a data protection request that designates a register number preset in the application; and a protection unit configured to transfer, to the trusted device, the data protection request in which the register number designated in the data protection request has been replaced with the register number of the application managed by the management unit.

According to the aspect, it is possible to avoid collision of use registers between a plurality of different applications when sealing data in association with a value of a register.

Further features of the present invention will become apparent from the following description of exemplary embodiments with reference to the attached drawings.

BRIEF DESCRIPTION OF THE DRAWINGS

FIGS. 2A to 2D are views for explaining data seal processing of the information processing apparatus.

FIG. 3 is a block diagram showing the arrangement of a boot processor.

FIG. 4 is a flowchart for explaining trusted boot processing executed by the boot processor.

FIGS. 5A to 5D are views showing examples of the PCR table of a register number manager.

FIG. 6 is a flowchart for explaining processing of an application loader executor.

FIG. 7 is a block diagram showing the arrangement of a software TPM.

FIG. 9 is a flowchart for explaining secret information seal processing.

FIGS. 12A to 12C are views showing examples of changes in the PCR values of a hardware TPM and a software TPM.

DESCRIPTION OF THE EMBODIMENTS

Information processing according to an embodiment of the present invention will now be described in detail with reference to the accompanying drawings.

A trusted device (for example, security chip) to be explained below includes a key pair memory that holds key pairs, a plurality of registers that store hash values, and an encoder that controls encoding or decoding using a key pair in accordance with a register value. That is, the encoder associates data to be sealed with a register number and its value and encodes the data using a public key (data protection). When the register value associated with the sealed data is correct, the encoder decodes the sealed data using a private key (release of data protection).

The following description will be made assuming that the trusted device is a TPM, and the register is a PCR. The following terms will be used to express requests to the TPM.

A hash value registration request will be referred to as an "extend request", a request to encode data associated with a value of a PCR (PCR value) as a "seal request", and a release request of the protected data as an "unseal request". Note that the extend request includes a PCR number (register number) and data (hash value) to be registered in the PCR of the PCR number.

To assign the PCR numbers (register numbers), not only an assigning method to be described below but also various other assigning methods are applicable.

First Embodiment

In the first embodiment, an example will be described in which normal data protection is performed when a plurality of applications request data protection using a single PCR. In other words, an information processing apparatus according to the first embodiment manages different PCR numbers for the respective applications, and controls to make the individual applications use the PCR numbers.

[Functional Arrangement]

Figure 1:
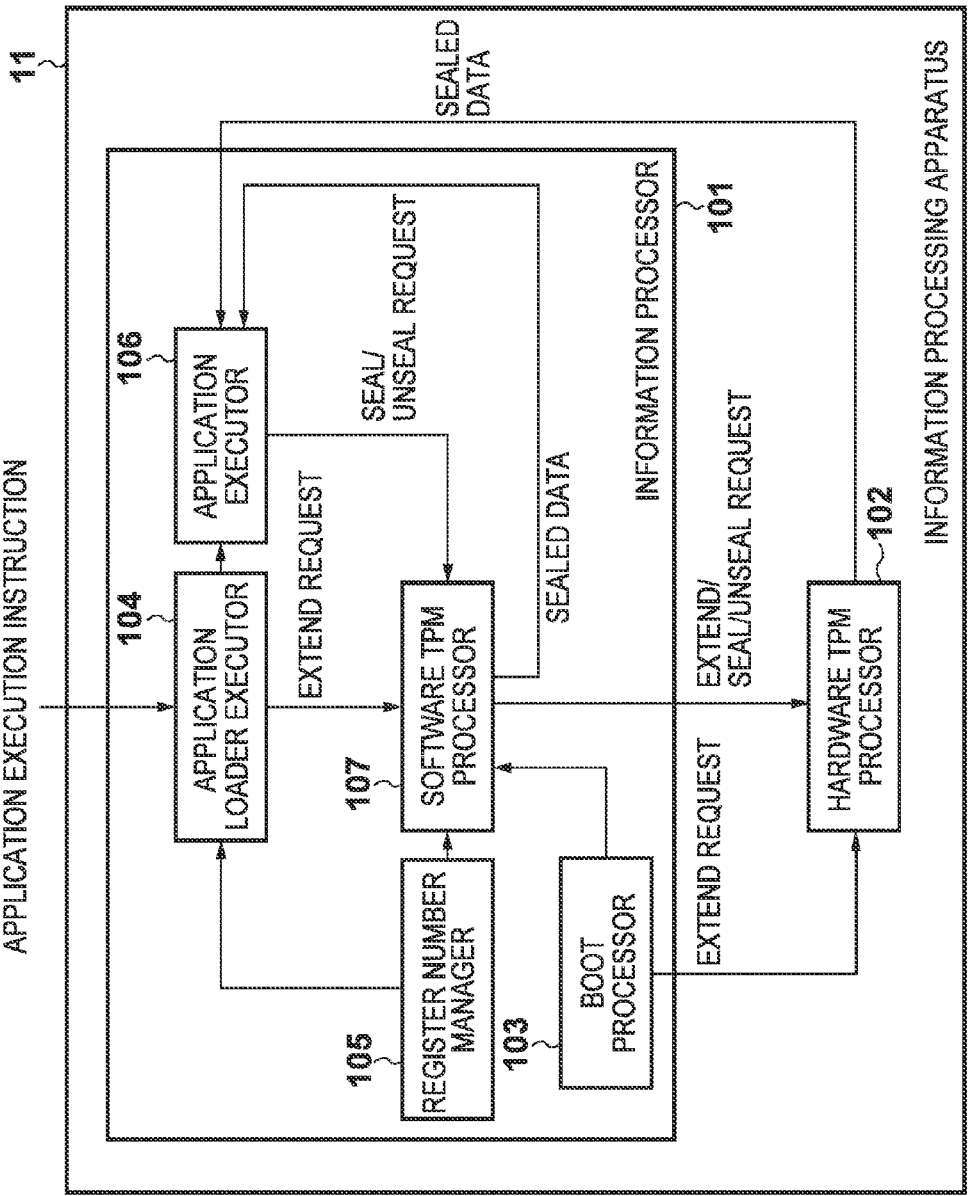
FIG. 1 is a block diagram showing the functional arrangement of an information processing apparatus according to an embodiment.

The block diagram of FIG. 1 shows the functional arrangement of an information processing apparatus 11 according to this embodiment. The information processing apparatus 11 includes an information processor 101 and a hardware TPM processor 102.

The information processor 101 includes a boot processor 103, an application loader executor 104, a register number manager 105, an application executor 106, and a software TPM processor 107. The arrangement of the information processor 101 is implemented by, for example, software executed by a microprocessor (CPU) using a memory such as a RAM (Random Access Memory), ROM (Read Only Memory), or hard disk drive (HDD). The hardware TPM processor 102 will sometimes be expressed as a "hardware TPM", and the software TPM processor 107 as a "software TPM" hereinafter.

The hardware TPM 102 includes N PCRs (to be referred to as "hardware PCRs" hereinafter), a hardware TPM-key memory that safely holds a storage root key (SRK) that is the key pair of the hardware TPM 102, and a hardware TPM encoder that performs encoding or decoding using the key pair. Note that the PCRs and the hardware TPM-key memory are nonvolatile memories. For example, there are 16 PCRs assigned PCR numbers 1 to 16. A PCR assigned a PCR number N will be expressed as "$PCR_N$". That is, No. 1 PCR is $PCR_1$, No. 2 PCR is $PCR_2$, . . . , and No. 16 PCR is $PCR_{16}$.

The hardware TPM 102 registers a hash value in a PCR in response to an extend request, and seals secret information or unseals sealed data using an SRK in response to a seal request or unseal request.

The boot processor 103 activates the information processing apparatus 11 by executing trusted boot processing to be described later, calculates the hash value of a system module, and registers the hash value in a predetermined hardware PCR in response to an extend request. The boot processor requests the hardware TPM 102 to decode the key pair of the software TPM 107 as needed, and supplies the decoded key pair to the software TPM 107.

In accordance with an application execution instruction of the user, the application loader executor 104 loads the binary data of the application from a storage medium such as an HDD (not shown), and causes the application executor 106 to start processing of the application. The application loader executor 104 also calculates the hash value of the application, and requests the hash value in a hardware PCR corresponding to a PCR number acquired from the register number manager 105 in response to an extend request.

Note that the application loader executor 104 can be implemented as a program to activate an executable file or by an execution environment to process a widget described in JavaScript or HTML5. The application loader executor 104 can also be implemented as a virtual machine that executes an application implemented by a program language such as Java™ or Python™.

The register number manager 105 returns a PCR number in response to a PCR number solution request (to be referred to as a "PCR solution request" hereinafter) received from the application loader executor 104 or the software TPM 107. The register number manager 105 manages the PCR numbers by a table (to be referred to as a "PCR table" hereinafter) stored in a memory and representing the correspondence between an application and a PCR number, which will be described later in detail. Instead of using the PCR table, a PCR number may dynamically be generated by calculation in response to a PCR solution request.

The application executor 106 executes the application activated by the application loader executor 104, and requests the software TPM 107 to seal secret information or unseal sealed data. The secret information indicates key information used by the application or personal information or setting information managed by the application.

To seal secret information, the application executor 106 designates a PCR number, requests the software TPM 107 to seal the secret information, and receives the sealed secret information (sealed data). For example, the application executor 106 outputs a seal request to seal key information to the software TPM 107 while setting a hardware $PCR_6$ and its value as conditions, and receives the sealed data of the key information from the software TPM 107. To unseal sealed data, the application executor 106 outputs a sealed data unseal request to the software TPM 107, and receives the unsealed secret information from the software TPM 107.

Note that a seal request to designate a plurality of PCRs and their values is also possible. In response to an unseal request for sealed data sealed by such a seal request, the software TPM 107 unseals the sealed data only when the PCR values are correct.

The software TPM 107 requests a hash value in a PCR based on an extend request. The software TPM 107 also seals secret information or unseals sealed data using the key pair of the software TPM 107 based on a seal request or an unseal request. The software TPM 107 also transfers, to the hardware TPM 102, a processing request to cause the hardware TPM 102 to perform processing in addition to the processes of the extend request, seal request, and unseal request.

[Processing Procedure]

Figures 2A, 2B:
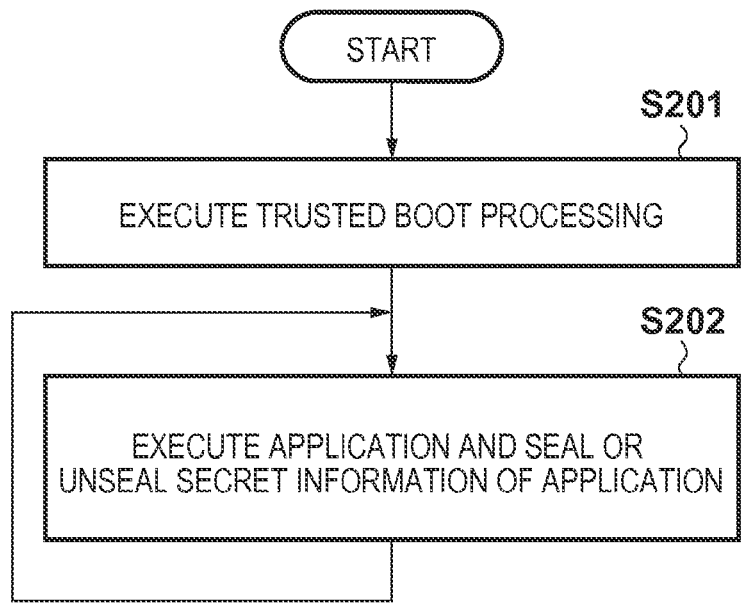

Data seal processing of the information processing apparatus 11 will be described with reference to FIGS. 2A to 2D. Note that FIGS. 2B to 2D illustrate changes in hardware PCR values in the respective processing steps shown in FIG. 2A. FIG. 2B shows the hardware PCR values upon booting the information processing apparatus 11. An initial value 0x00000000 is set upon booting the information processing apparatus 11.

The boot processor 103 executes trusted boot processing as system activation processing (S201). In step S201, the hash values of systems such as a BIOS and a boot loader are set in the hardware PCRs in response to an extend request from the boot processor 103, and the hardware PCR values change to the states (examples) shown in FIG. 2C. That is, the hash values of the BIOS, the boot loader, the kernel, and the software TPM 107 are set in $PCR_1$ to $PCR_4$, respectively.

After that, the information processing apparatus 11 activates an application in accordance with a user instruction, and data protection by the software TPM 107 or the hardware TPM 102 is executed (S202). That is, the hash value of the application is set in a hardware PCR by a method to be described later, and the secret information of the application is sealed or sealed data is unsealed by the PCR and its value.

FIG. 2D shows the states (examples) of the hardware PCR values after a plurality of applications App1, App2, and App3 are activated. That is, the hash values of App1, App2, and App3 are set in $PCR_6$, $PCR_7$, and $PCR_8$, respectively, by the extend request. A hash value generated from the hash values of the plurality of applications by the extend request is set in $PCR_5$.

If an extend request to register a new hash value is issued, the current PCR value designated by the extend request and the hash value of data linked with the new hash value are stored in the PCR by, for example, $$V_N = SHA1(V_N + \text{digest}) \quad (1)$$

where
$V_N$ is the PCR value of $PCR_N$,
SHA1 is a hash function,
digest is the new hash value, and
"+" is concatenation.

For this reason, $PCR_5$ stores a hash value $V_5$ generated from the hash values of Apps (in this example, App1, App2, and App3). The hash value $V_5$ changes depending on the activation order of the applications.

Upon receiving an attestation request, the information processing apparatus 11 may send an attestation response using only the hardware PCR values. Alternatively, the information processing apparatus 11 may send an attestation response using the hardware PCR values including the PCR value (virtual PCR value to be described later) of the software TPM 107. Note that the attestation is a protocol used to verify the system configuration of the information processing apparatus 11 and authenticate the device from an external apparatus. In response to a request from the external apparatus, a response is sent by adding a digital signature to the PCR values managed by the TPM. The external apparatus authenticates the configuration of the information processing apparatus 11 by verifying the digital signature included in the response and inspecting the PCR values.

[Boot Processor]

The arrangement of the boot processor 103 will be described with reference to the block diagram of FIG. 3.

A module memory 501 corresponds to the memory (ROM or HDD) of the information processing apparatus 11, and stores the software modulates of the system such as a BIOS, boot loader, and kernel. These software modules are loaded to the work area of a RAM or the like and executed by the CPU, as needed.

A CRTM processor 502 executes a CRTM (core root of trust for measurement) program loaded from the module memory 501 upon activating the information processing apparatus 11. The CRTM processor 502 then loads the BIOS program from the module memory 501, calculates the hash value, registers the hash value in a hardware $PCR_1$, loads the BIOS module to the work area, and starts executing the BIOS. Note that the hash value of the CRTM program may be calculated and set in the hardware PCR.

A BIOS processor 503 is activated by the CRTM processor 502, loads the boot loader program from the module memory 501, and executes it. The BIOS processor 503 also calculates the hash value of the boot loader and registers the hash value in a hardware $PCR_2$.

A boot loader processor 504 is activated by the BIOS processor 503, loads the kernel program from the module memory 501, and executes it. The boot loader processor 504 also calculates the hash value of the kernel and registers the hash value in a hardware $PCR_3$.

A kernel processor 505 is activated by the boot loader processor 504, loads the kernel of the OS (Operating System) of the information processing apparatus 11 from the module memory 501, and executes it. The kernel processor 505 also loads the software of the software TPM 107 from the module memory 501, calculates the hash value, and registers the hash value in a hardware $PCR_4$.

Trusted boot processing executed by the boot processor 103 will be described with reference to the flowchart of FIG. 4.

When activation of the information processing apparatus 11 is instructed, the boot processor 103 activates the CRTM processor 502 (S601). The CRTM processor 502 calculates the hash value of the BIOS that is the module to be executed next in the boot sequence, registers the hash value in the hardware $PCR_1$, and activates the BIOS processor 503 (S602).

The BIOS processor 503 calculates the hash value of the boot loader that is the module to be executed next in the boot sequence, registers the hash value in the hardware $PCR_2$, and activates the boot loader processor 504 (S603).

The boot loader processor 504 calculates the hash value of the kernel that is the module to be executed next in the boot sequence, registers the hash value in the hardware $PCR_3$, and activates the kernel processor 505 (S604).

The boot kernel processor 505 calculates the hash value of the software TPM 107 that is the module to be executed next in the boot sequence, registers the hash value in the hardware $PCR_4$, and activates the software TPM 107 (S605).

With the above-described trusted boot processing, the information processing apparatus 11 is activated, and the hash values of the software modules executed in the boot process are set in the hardware PCRs. That is, the PCR values (FIG. 2B) upon activating the information processing apparatus 11 are rewritten to the PCR values shown in FIG. 2C by the trusted boot processing.

[Register Number Manager]

FIGS. 5A to 5D illustrate examples of the PCR table of the register number manager 105.

FIG. 5A shows an example of the PCR table that manages the PCR numbers in accordance with the paths of applications on the file system. The first column indicates the file path of each application, and the second column indicates the PCR number used by the application. For example, an application identified by a path /usr/local/bin/appli1 uses the hardware $PCR_6$. Similarly, an application identified by a path /usr/local/bin/appli2 uses a hardware $PCR_7$, and an application identified by a path /usr/local/bin/appli3 uses a hardware $PCR_8$.

The register number manager 105 returns a PCR number corresponding to the path of the application included in a PCR solution request received from the application loader executor 104 or the software TPM 107. Note that processing for the PCR solution request is processing of receiving information from the request source application and returning the PCR number assigned to the application.

The PCR solution request includes information associated with the request source application, such as the path of the application, the execution user hash value, and the process ID. It is therefore possible to manage the PCR numbers using not only the paths of applications but also other elements.

FIG. 5B shows a PCR table used to manage the PCR numbers in accordance with the paths of applications and user rights to execute the applications. Referring to FIG. 5B, the second column indicates the user who has activated each application, and the third column indicates the PCR number used for each combination of the information of the first column and that of the second column. When the user of the root right activates an application identified by a path /usr/local/bin/appli1, the application uses the hardware $PCR_6$. On the other hand, when the user of the user right activates the same program, the application uses the hardware $PCR_7$.

FIG. 5C shows a PCR table used to manage the PCR numbers based on the hash values of applications. Referring to FIG. 5C, the first column indicates the hash value of each application to be activated, and the second column indicates the PCR number used by the application identified by the hash value. For example, an application identified by a hash value 0x12345678 uses the hardware $PCR_6$.

If the applications are widgets identified by URLs (Uniform Source Locators), a PCR table shown in FIG. 5D which manages the PCR numbers in association with the URLs is usable. Referring to FIG. 5D, the first column indicates the URL of each widget, and the second column indicates the PCR number corresponding to the URL. For example, a widget having a URL http://example.org/appli1 uses the hardware $PCR_6$.

The PCR table of the register number manager 105 can be generated at the time of installation of the applications or generated by the application loader executor 104 upon activating the applications. The PCR table is preferably safely protected by the OS or the like.

An application that needs a high-level security right or an application activated earlier may have priority to use a hardware PCR. In other words, an application that needs the root right or an application activated by the root user is assigned to a hardware PCR. An application activated for the first time after activation of the information processing apparatus 11 after all the hardware PCRs have been assigned (in other words, there is no hardware PCR having the initial value 0x00000000) is assigned to a PCR (virtual PCR to be described later) of the software TPM 107. This makes it possible to assign the hardware PCRs to applications that need a high-level security right and more safely seal secret information.

[Application Loader Executor]

Processing of the application loader executor 104 will be described with reference to the flowchart of FIG. 6. Note that the processing shown in FIG. 6 is executed when the user has instructed to execute an application.

The application loader executor 104 starts activation processing of the application App1 in accordance with a user instruction (S801). The application loader executor 104 loads the binary data of App1 from the module memory 501, calculates the hash value of the binary data (S802), transmits a PCR solution request to the register number manager 105, and acquires the PCR number of App1 (S803).

The register number manager 105 returns a PCR number X corresponding to the path or hash value of App1 included in the PCR solution request using one of the PCR tables shown in FIG. 5A to 5D. If the PCR number of App1 is unregistered, the register number manager 105 registers the PCR number of App1 in the PCR table and returns the PCR number. Alternatively, the application loader executor 104 may cause the register number manager 105 to register the PCR number of App1.

The application loader executor 104 acquires the current hardware $PCR_X$ value and determines whether it equals the initial value of the hardware PCR (S804). That is, the initial value of the PCR in this embodiment is 0x00000000, as shown in FIG. 2B, and the application loader executor 104 determines whether the current hardware $PCR_X$ value is 0x00000000.

If the hardware $PCR_X$ value equals the initial value, the application loader executor 104 outputs, to the software TPM 107, an extend request to set the hash value of App1 in the hardware $PCR_X$ (S805). In other words, if App1 is executed for the first time after activation of the information processing apparatus 11, the process advances to step S805. After that, the application loader executor 104 loads App1 to the work area of the RAM and activates App1 (S806). The activated App1 requests the software TPM 107 to seal secret information or unseal sealed data by a method to be described later (S807).

On the other hand, upon determining in step S804 that the current hardware $PCR_X$ value does not equal the initial value, the process advances to step S808. That is, if App1 is executed for the second or subsequent time after activation of the information processing apparatus 11, the process advances to step S808. The application loader executor 104 compares the current hardware $PCR_X$ value with the hash value of App1 and determines whether the values equal (S808). If the current hardware $PCR_X$ value equals the hash value of App1, the application loader executor 104 activates App1 without issuing the extend request to the hardware $PCR_X$ (S806).

On the other hand, upon determining in step S808 that the current hardware $PCR_X$ value does not equal the hash value of App1, for example, different applications may use the single PCR. Hence, the application loader executor 104 executes abnormal processing (S809). As the abnormal processing, for example, the user may be notified of an error message representing that an error has occurred in using the PCR for execution of App1, or the error state may be recorded in the log. After the abnormal processing, App1 may be activated, or activation of App1 may be aborted.

[Software TPM]

The block diagram of FIG. 7 shows the arrangement of the software TPM 107.

Upon receiving an extend request, a seal request, or an unseal request, a hardware TPM controller 904 inquires of a PCR number solution unit 902 about the PCR number of the request source application.

To acquire the PCR number of the request source application, the PCR number solution unit 902 transmits a PCR number solution request to the register number manager 105, and outputs the returned PCR number to the hardware TPM controller 904.

The hardware TPM controller 904 rewrites the PCR number designated by the received request to the PCR number acquired from the PCR number solution unit 902 and transfers the request to the hardware TPM 102. The hardware TPM controller 904 returns, to the request source application, data (including secret information or sealed data) returned from the hardware TPM 102.

[Application Executor]

Protection Request Processing

Secret information protection request processing issued by an application will be described with reference to the flowcharts of FIGS. 8A to 8C. Note that the processes shown in FIGS. 8A to 8C correspond to the processing of step S807 in FIG. 6. A protection request corresponds to a secret information seal request or a sealed data unseal request.

For example, App1 determines whether secret information is already sealed by the TPM, and switches between the secret information seal request and the sealed data unseal request in accordance with the determination result.

Figure 8A:
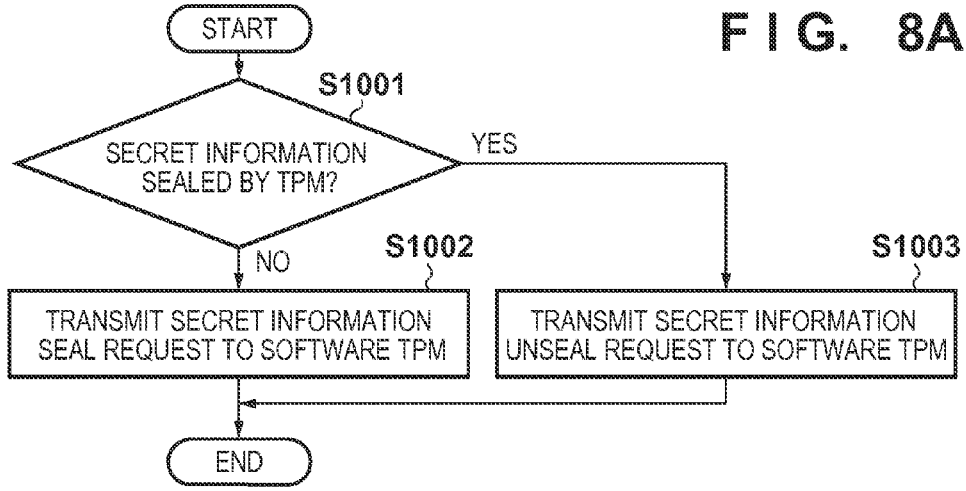
FIGS. 8A to 8C are flowcharts for explaining secret information protection request processing issued by an application.

That is, in FIG. 8A, when using secret information, the application executor 106 that executes App1 determines whether the secret information is sealed by the TPM (S1001). If the secret information is not sealed, the application executor 106 transmits a secret information seal request to the software TPM 107 by a method to be described later (S1002). App1 then acquires the sealed secret information.

If the secret information is already sealed, the application executor 106 transmits a sealed data unseal request to the software TPM 107 by a method to be described later (S1003). App1 then performs data processing using the unsealed secret information. As described above, the processing shown in FIG. 8A is effective when App1 already has sealed secret information.

Switching between the secret information seal request and the sealed data unseal request can also be done depending on, for example, whether execution of the application App1 is done for processing concerning installation of an application.

Figure 8B:
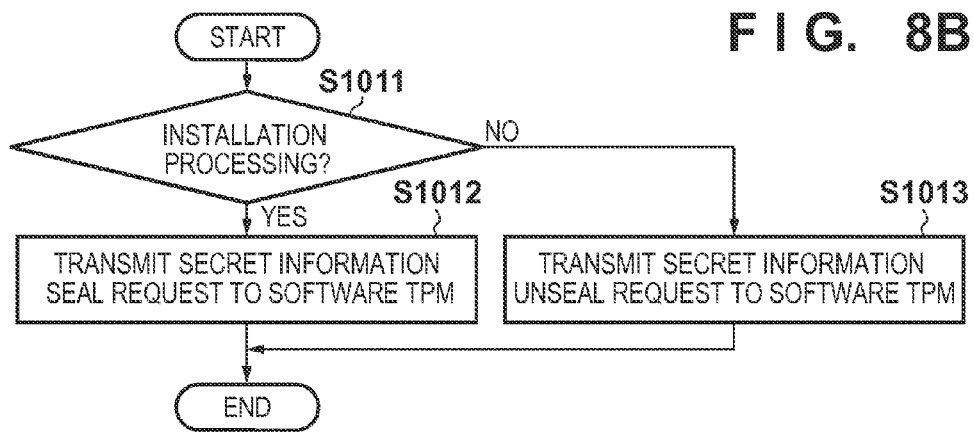

That is, in FIG. 8B, the application executor 106 determines whether processing that is being executed is processing of installing an application (S1011). If the processing is installation processing, the application executor 106 transmits a secret information seal request to the software TPM 107 by a method to be described later (S1012). App1 then acquires the sealed secret information.

If the processing is not installation processing, the application executor 106 transmits a sealed data unseal request to the software TPM 107 by a method to be described later (S1013). App1 then performs data processing using the unsealed secret information.

As described above, according to the processing shown in FIG. 8B, the secret information of an application is sealed at the time of installation. It is therefore possible to more safely manage the secret information. Alternatively, when the processing shown in FIG. 8B is executed upon updating App1 (for example, while installing at the time of upgrading), the secret information can be appropriately sealed using the hash value of App1 after the update is complete. In other words, transfer of secret information at the time of updating can be performed more smoothly. Note that the processing of step S1012 is processing of sealing, using the hash value of App1 after updating, secret information sealed using the hash value of App1 before updating.

Switching between the secret information seal request and the sealed data unseal request can also be done in accordance with a user request.

Figure 8C:
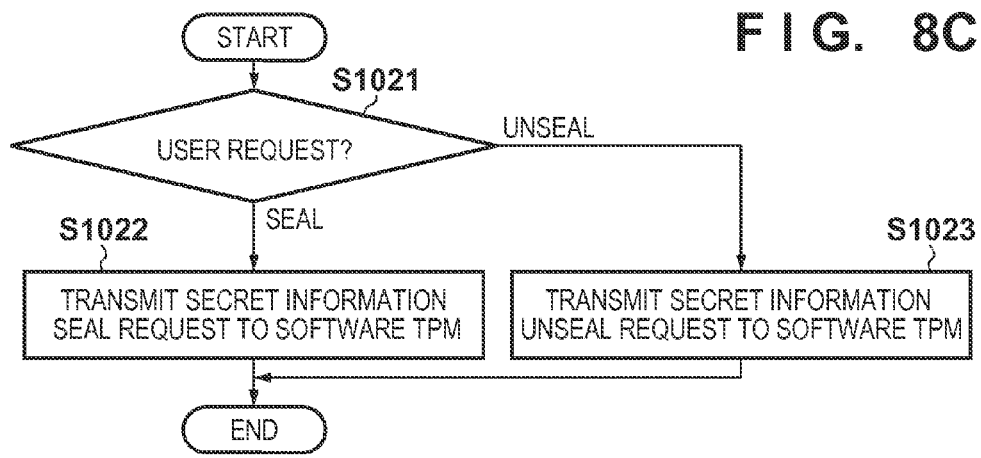

That is, in FIG. 8C, the application executor 106 determines the user request (S1021). For example, when the user requests to seal, for example, secret information of a plaintext, the application executor 106 transmits a secret information seal request to the software TPM 107 by a method to be described later (S1022). The user then acquires the sealed secret information.

When the user requests sealed data to be unsealed, the application executor 106 transmits a sealed data unseal request to the software TPM 107 by a method to be described later (S1023). The user then performs data processing using the unsealed secret information. As described above, the processing shown in FIG. 8C can seal secret information and unseal sealed data at an arbitrary timing in accordance with the user request.

Note that in steps S1002, S1012, and S1022, secret information of an encryption key to be sealed may be generated. The processes shown in FIGS. 8A to 8C may be implemented independently or combined. For example, when installing an application, secret information is sealed by the processing shown in FIG. 8B. When the application is activated after the installation, the processing shown in FIG. 8A or 8B can be performed.

Secret Information Seal Processing

Secret information seal processing will be described with reference to the flowchart of FIG. 9. Note that processing shown in FIG. 9 corresponds to the processes of steps S1002, S1012, and S1022 in FIGS. 8A to 8C.

The application executor 106 that executes the application App1 transmits a secret information seal request for designating the $PCR_N$ to the software TPM 107 (S1101). The PCR number N designated here is, for example, the PCR number decided by the developer at the time of implementation of App1, and need not be the same as the PCR number X acquired for App1 by the application loader executor 104 in step S804. In other words, App1 need not recognize the hardware $PCR_X$ in which the hash value of App1 is registered in step S805, and can use a desired PCR independently of the designated PCR number.

The software TPM 107 causes the PCR number solution unit 902 to solve the PCR number X corresponding to App1 as the seal request source (S1102). The software TPM 107 then causes the hardware TPM controller 904 to replace the PCR number N of the seal request received from the application executor 106 with the PCR number X (S1103). That is, the software TPM 107 receives the seal request with the PCR number N designated by App1, and replaces the PCR number with the PCR number X solved by the PCR number solution unit 902. Even when App1 and App2 request to seal secret information by designating the same PCR number N, different PCR numbers are assigned to App1 and App2, and the secret information can appropriately be sealed.

Next, the software TPM 107 causes the hardware TPM controller 904 to transfer the seal request including the rewritten PCR number to the hardware TPM 102. Hence, the hardware TPM 102 encodes (seals) the secret information by the public key of the hardware TPM 102 using the hardware $PCR_X$ as a condition (S1104). The application executor 106 (App1) saves the sealed secret information in a memory such as an HDD or a storage medium such as a semiconductor memory card (S1105).

Unseal of Secret Information

Figure 10:
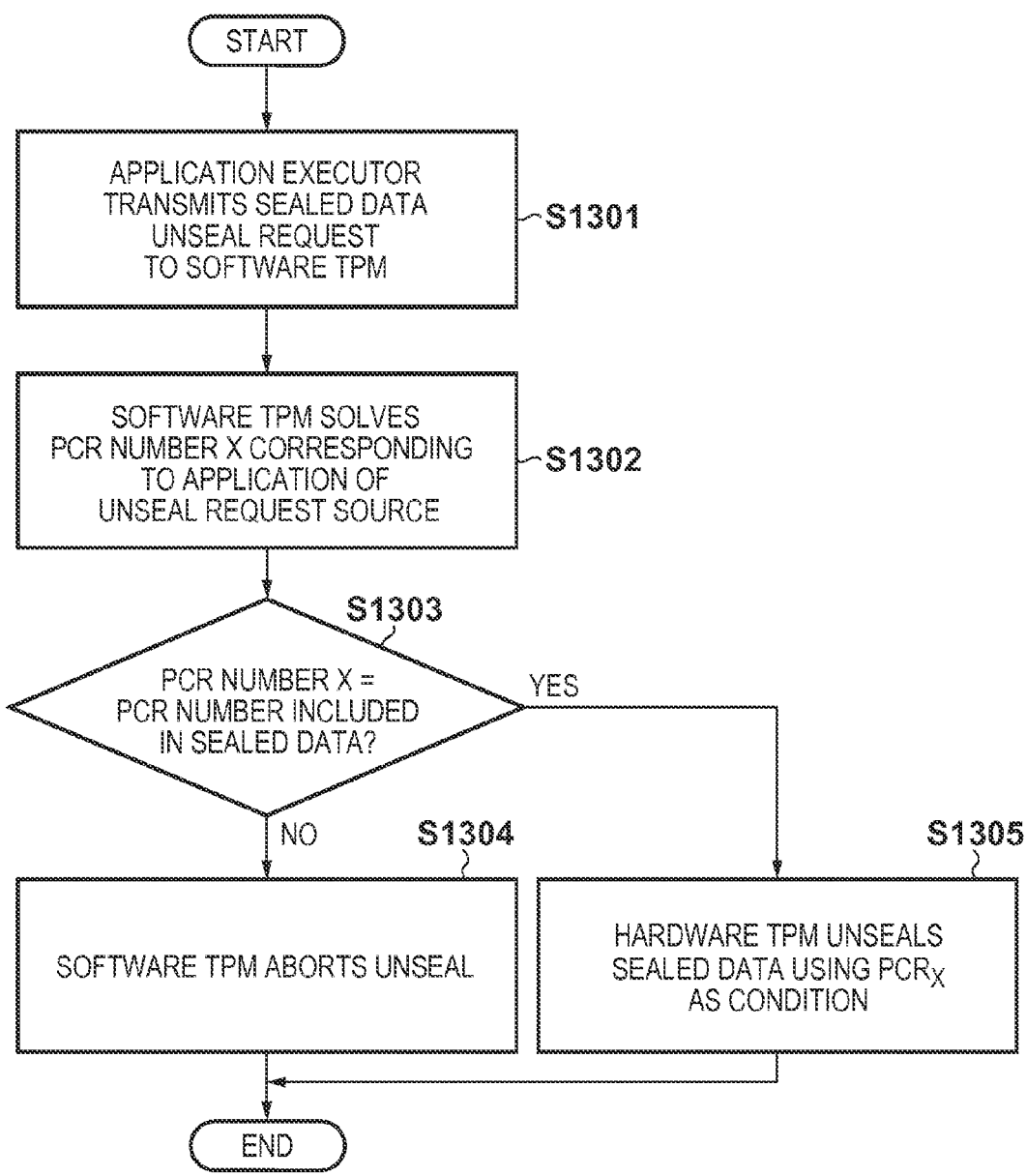
FIG. 10 is a flowchart for explaining secret information unseal processing.

Secret information unseal processing will be described with reference to the flowchart of FIG. 10. Note that processing shown in FIG. 10 corresponds to the processes of steps S1003, S1013, and S1023 in FIGS. 8A to 8C.

The application executor 106 that executes the application App1 transmits a sealed data unseal request to the software TPM 107 (S1301). Note that the sealed data includes the PCR number X designated at the time of seal and the $PCR_X$ value at the time of seal.

Next, the software TPM 107 causes the PCR number solution unit 902 to solve the PCR number X corresponding to App1 as the unseal request source (S1302), and determines whether the PCR number X matches the PCR number included in the sealed data (S1303). If the PCR number X and the PCR number included in the sealed data are different, the software TPM 107 judges that the unseal request has come from an unauthorized application and aborts the unseal (S1304). This makes it possible to prevent another application from unauthorizedly unsealing sealed data using the PCR assigned to App1 during the operation of App1.

On the other hand, upon determining in step S1303 that the PCR number X matches the PCR number included in the sealed data, the software TPM 107 causes the hardware TPM 102 to unseal the sealed data via the hardware TPM controller 904 (S1305). That is, the sealed data is unsealed (decoded) using the private key of the hardware TPM 102 using the hardware $PCR_X$ as a condition.

As described above, the software TPM 107 unseals sealed data only when the PCR number set for the sealed data as a condition matches the PCR number assigned to App1. Even when the PCR numbers match, unseal is aborted if the hardware $PCR_X$ value and the PCR value included in the sealed data do not match at the time of unseal by the hardware TPM 102.

As described above, the software TPM 107 solves the PCR number of each application managed by the register number manager 105 and uses it as the PCR number for processing executed by the hardware TPM 102. Hence, even when a plurality of different applications are implemented to use the same PCR number, each application can appropriately seal secret information by the TPM.

Second Embodiment

Information processing according to the second embodiment of the present invention will be described below. Note that the same reference numerals as in the first embodiment denote the same parts in the second embodiment, and a detailed description thereof will be omitted.

In the first embodiment, a method of avoiding collision in using PCRs when a plurality of different applications are implemented to use the same PCR number has been described. However, the number of PCRs of a general security chip is limited to, for example, 16. For this reason, when the number of applications that use a hardware TPM 102 to seal secret information increases, and unused PCRs have run out, it is difficult to seal secret information by the hardware TPM 102. In the second embodiment, a method of solving this problem by a software TPM 107 using a virtual PCR will be explained.

[Processing Procedure]

Figure 11:
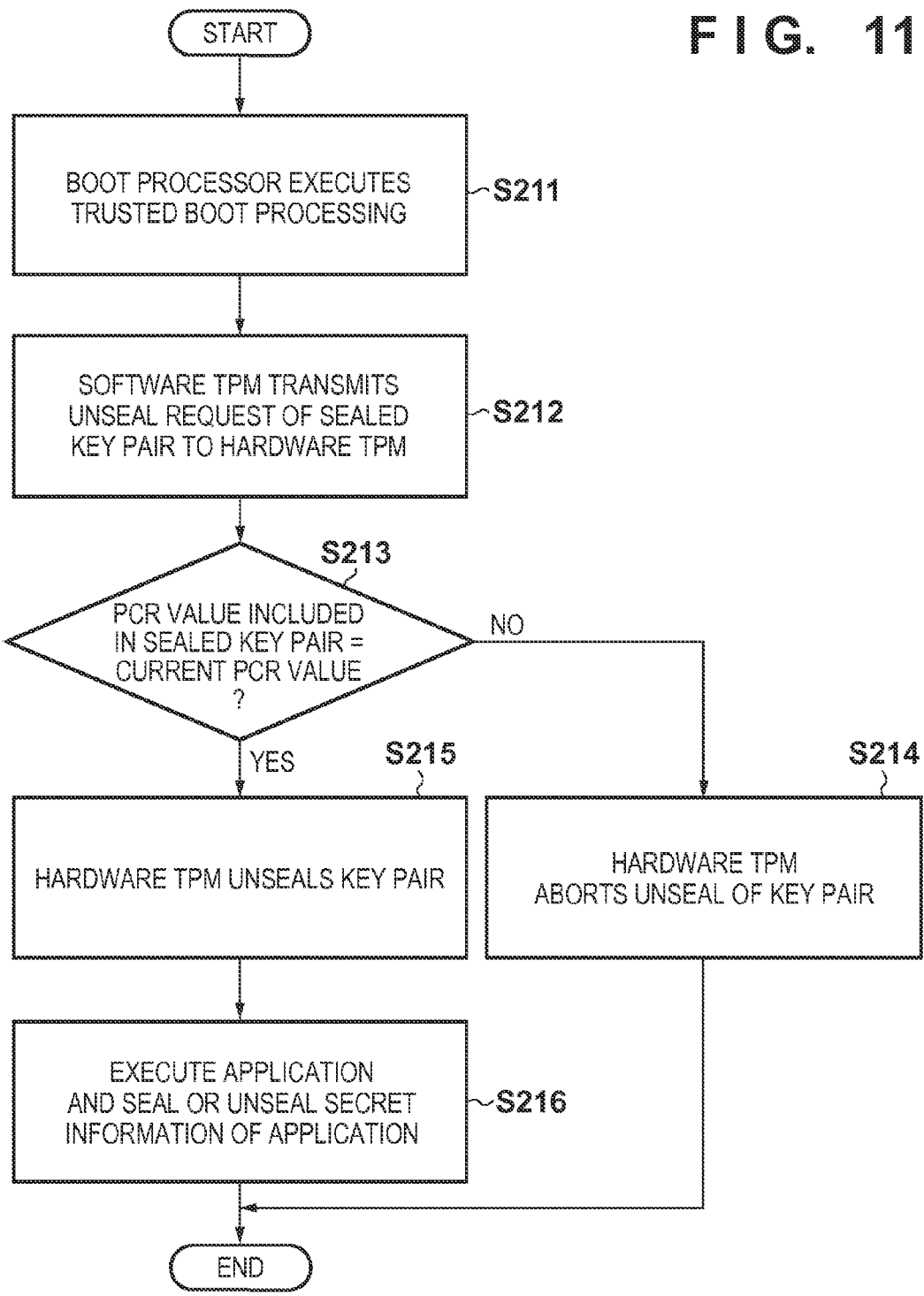
FIG. 11 is a flowchart for explaining data seal processing of an information processing apparatus according to the second embodiment.

Data seal processing of an information processing apparatus 11 according to the second embodiment will be described with reference to the flowchart of FIG. 11. FIGS. 12A to 12C show examples of changes in the PCR values of the hardware TPM 102 and the software TPM 107. FIG. 12A shows the PCR values of the hardware TPM 102 and the software TPM 107 upon booting the information processing apparatus 11. An initial value 0x00000000 is set upon booting the information processing apparatus 11.

A boot processor 103 executes trusted boot processing as system activation processing (S211). In step S211, the hash values of systems such as a BIOS and a boot loader are set in the hardware PCRs in response to an extend request from the boot processor 103, and the hardware PCR values change to the states (examples) shown in FIG. 12B. That is, the hash values of the BIOS, the boot loader, the kernel, and the software TPM 107 are set in $PCR_1$ to $PCR_4$, respectively. At this point of time, the virtual PCR values remain the initial value.

Next, the software TPM 107 transmits an unseal request of the key pair of the software TPM 107, which is sealed by the hardware TPM 102, to the hardware TPM 102 (S212).

Figure 13:
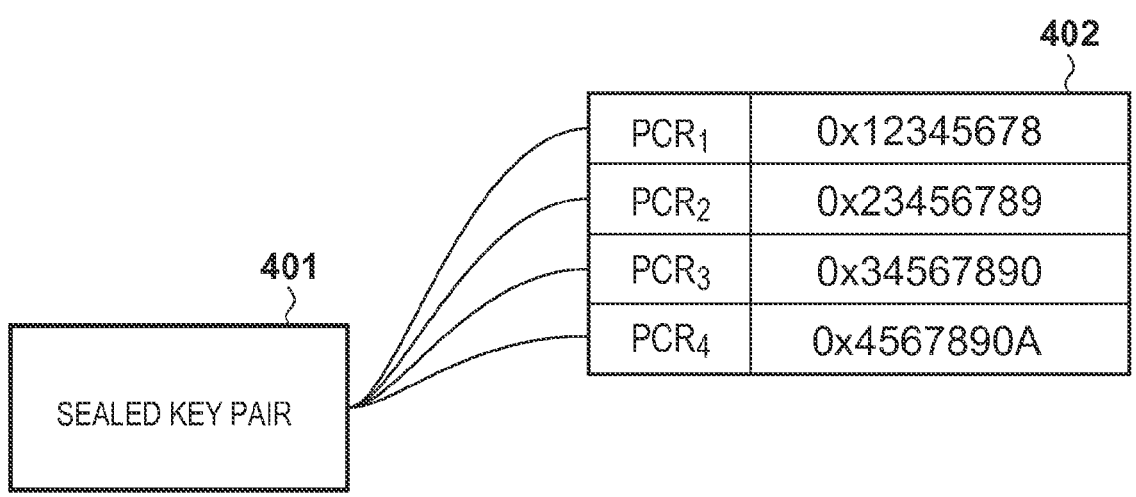
FIG. 13 is a view showing an example of the data structure of the key pair of the software TPM, which is sealed by the hardware TPM.

FIG. 13 illustrates an example of the data structure of the key pair of the software TPM 107, which is sealed by the hardware TPM 102. Referring to FIG. 13, sealed data 401 that is an already sealed key pair is the key pair of the software TPM 107, which is encoded by the public key of the hardware TPM 102. Data 402 represents the PCR numbers designated at the time of seal of the key pair and the register values of the PCRs at that point of time. That is, when a hardware $PCR_1$ value to a hardware $PCR_4$ value match the respective values of the data 402 at the time of unseal request of the sealed data 401, the hardware TPM 102 unseals the sealed data 401.

The hardware TPM 102 determines whether the PCR values included in the sealed key pair 401 match the current hardware PCR values (S213). If the values do not match, the hardware TPM 102 aborts unseal of the key pair, and limits the system of the information processing apparatus 11 (S214). If the PCR values included in the sealed key pair 401 match the current hardware PCR values in step S213, the hardware TPM 102 unseals the key pair 401 (S215).

After that, the information processing apparatus 11 activates the applications in accordance with a user instruction, and data protection by the software TPM 107 or the hardware TPM 102 is executed (S216). That is, the hash values of the applications are registered in the hardware PCRs or virtual PCRs by a method to be described later, and seal or unseal of data concerning the applications is performed by the PCRs and their values.

FIG. 12C shows examples of the hardware PCR values and virtual PCR values after a plurality of applications App1, App2, and App3 are activated. That is, the hash values of App1, App2, and App3 are set in virtual $PCR_{101}$, virtual $PCR_{102}$, and virtual $PCR_{103}$, respectively, by an extend request. A hash value generated from the hash values of the plurality of applications Apps is set in a hardware $PCR_5$ by the extend request. Note that the hash value in the hardware $PCR_5$ changes depending on the activation order of the applications, as described above.

[Software TPM]

Figure 14:
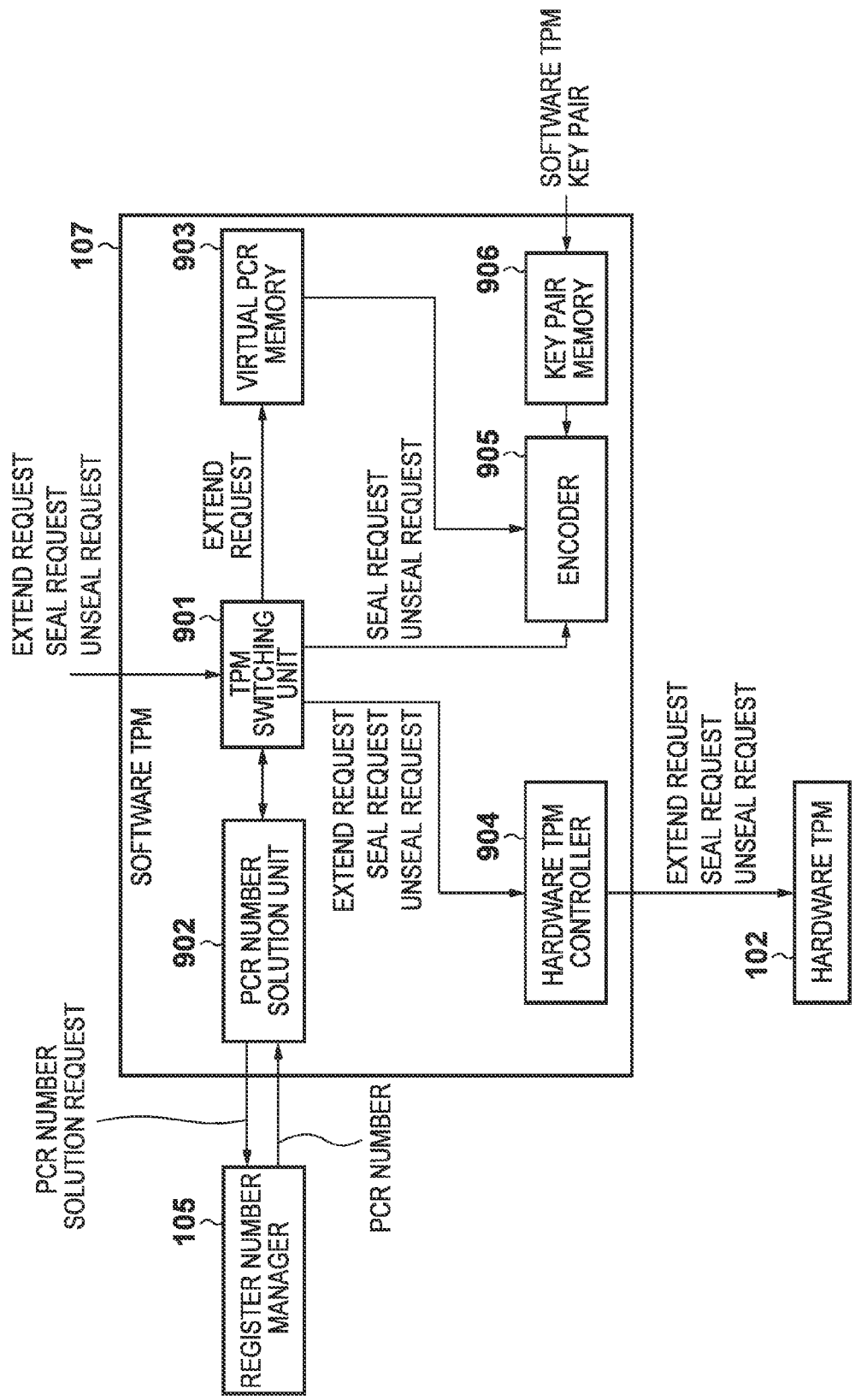
FIG. 14 is a block diagram showing the arrangement of the software TPM.

The block diagram of FIG. 14 shows the arrangement of the software TPM 107. Note that parts different from the arrangement of the software TPM 107 according to the first embodiment shown in FIG. 7 will mainly be described.

A TPM switching unit 901 determines, based on the PCR number designated by an extend request, a seal request, or an unseal request, whether to cause the software TPM 107 or the hardware TPM 102 to process the request. For example, if the PCR number designated by an extend request of an application loader executor 104 falls within the range of the hardware PCRs (for example, No. 1 to No. 16), the hash value included in the request is registered in a hardware PCR. If the PCR number falls outside the range of the hardware PCRs (for example, from No. 17), the hash value included in the request is registered in a virtual PCR.

If a predetermined PCR (for example, hardware $PCR_{10}$) commonly used by the applications is designated, an extend request to designate a hardware $PCR_{10}$ may be issued, and an extend request to designate a PCR solved by a PCR number solution unit 902 may be issued. A hash value linked with the hash value of the activated application is registered in the hardware $PCR_{10}$ shared by the applications, and the hash values of the individual applications are registered in $PCR_X$.

When the PCR number designated in a seal request of an application executor 106 indicates a virtual PCR, an encoder 905 of the software TPM 107 seals secret information. When the PCR number included in sealed data requested to be unsealed indicates a virtual PCR, the encoder 905 of the software TPM 107 unseals the sealed data, as a matter of course. On the other hand, if the software TPM 107 does not process the seal request or unseal request, the request is transferred to a hardware TPM controller 904.

A virtual PCR memory 903 stores $PCR_{100}$ to $PCR_{999}$ as a table (virtual PCR table) as shown in, for example, FIGS. 12A to 12C. Note that the virtual PCR table is preferably safely managed by the OS or the like.

The encoder 905 processes the seal request or unseal request input from the TPM switching unit 901 using a virtual PCR. That is, for the seal request, sealed data obtained by encoding (sealing) secret information using the public key managed by a key pair memory 906 in association with a designated virtual PCR is returned to the seal request source. For the unseal request, it is determined whether the PCR number included in the sealed data and its value match the virtual PCR number and its value. If they match, secret information obtained by decoding (unsealing) sealed data using the private key managed by the key pair memory 906 is returned to the unseal request source. If no matching is obtained, unseal of the seal request is aborted, as a matter of course.

The key pair memory 906 stores the key pair (public key and private key) of the software TPM 107, which is decoded by the hardware TPM 102. The key pair memory 906 is preferably safely protected by the OS or the like.

Note that the above description has been made assuming that the encoder 905 uses an asymmetric key type encryption algorithm represented by RSA encryption. However, a symmetric key type encryption algorithm such as AES encryption is also usable. In this case, the key pair memory 906 need only store one private key in place of a key pair of a private key and a public key.

[Application Executor]

Secret Information Seal Processing

Figure 15:
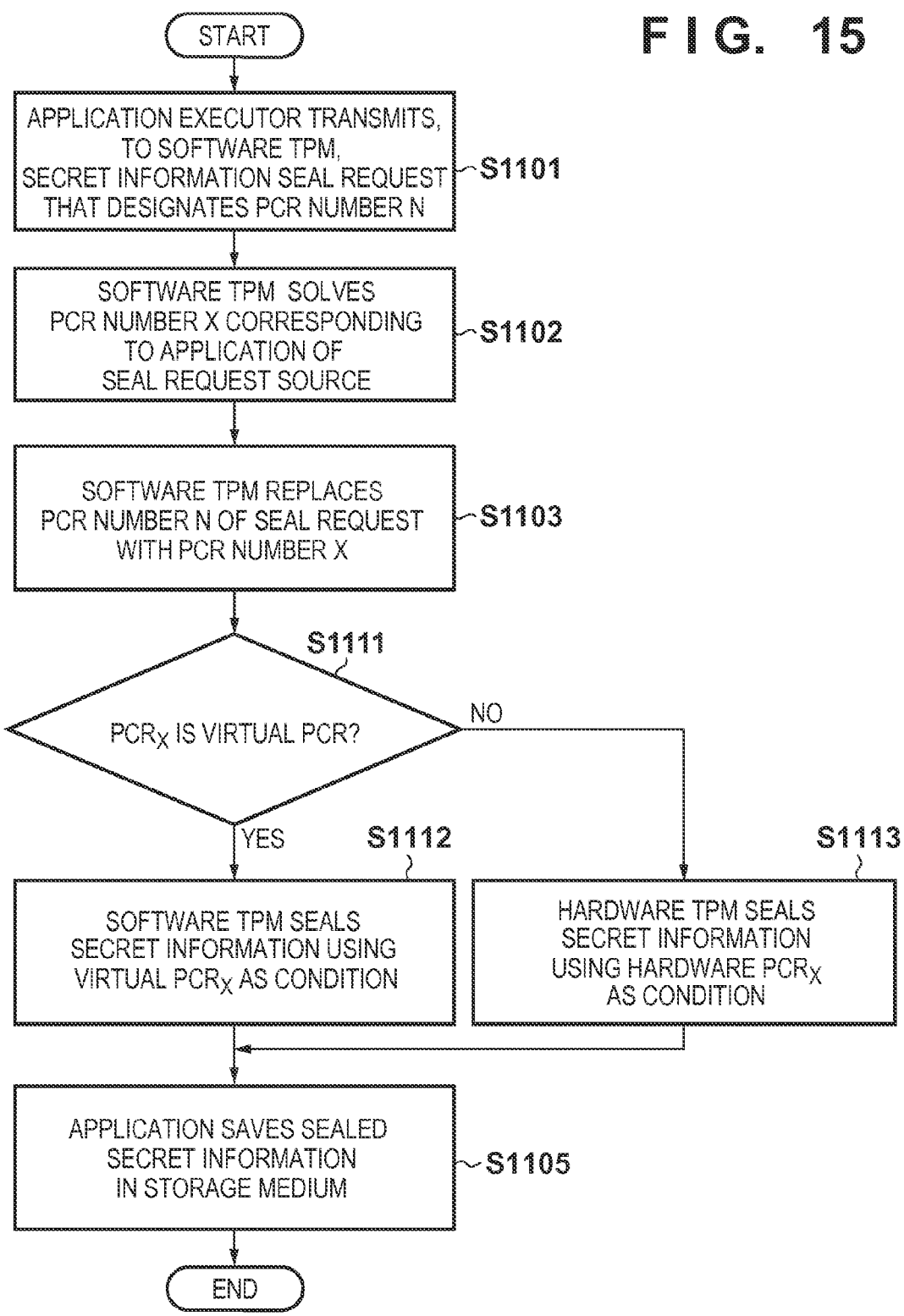
FIG. 15 is a flowchart for explaining secret information seal processing.

Secret information seal processing will be described with reference to the flowchart of FIG. 15. Note that the processing shown in FIG. 15 corresponds to the processes of steps S1002, S1012, and S1022 in FIGS. 8A to 8C. The processes of steps S1101 to S1103 and S1105 are the same as those shown in FIG. 9, and a detailed description thereof will be omitted.

The software TPM 107 determines whether a PCR number X solved by the PCR number solution unit 902 corresponds to a virtual PCR (S1111). For example, if the PCR number X is larger than the number of hardware PCRs, $PCR_X$ is determined as a virtual PCR.

If $PCR_X$ is a virtual PCR, the software TPM 107 causes the encoder 905 using the public key of the key pair memory 906 to encode (seal) secret information in association with the virtual $PCR_X$ (S1112). On the other hand, if $PCR_X$ is a hardware PCR, the software TPM 107 causes the hardware TPM 102 to process the seal request via the hardware TPM controller 904 (S1113). That is, the secret information is encoded (sealed) by the public key of the hardware TPM 102 in association with the hardware $PCR_X$ (S1113).

Note that the secret information can be sealed in association with not only one PCR but also a plurality of PCRs. When at least one PCR is a virtual PCR, the software TPM 107 causes the encoder 905 to seal the secret information. At this time, if necessary, the hardware PCR value is loaded from the PCR and included in the sealed data.

Figure 16A:
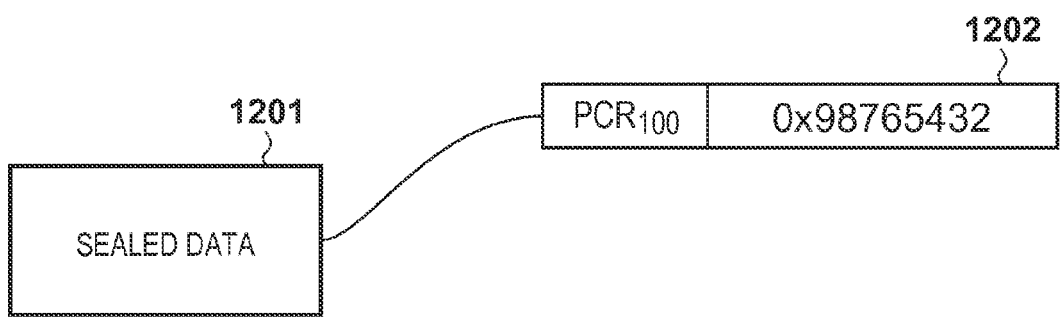
FIGS. 16A and 16B are views for explaining examples of the data structure of sealed data.
Figure 16B:
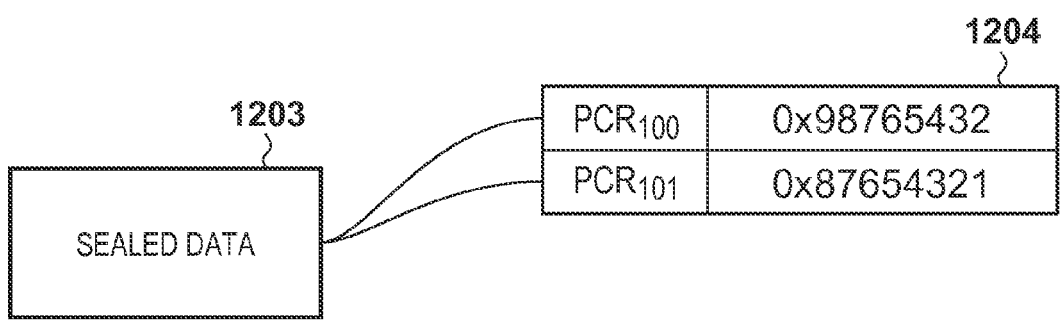

Examples of the data structure of sealed data will be describe with reference to FIGS. 16A and 16B. FIG. 16A illustrates an example of the data structure when secret information is sealed using one PCR as a condition. Sealed data 1201 is encoded secret information, and data 1202 represents a PCR number and its value. In response to the unseal request of the sealed data 1201, the software TPM 107 unseals the sealed data 1201 only when the $PCR_{100}$ value of the data 1202 and the current virtual $PCR_{100}$ value match.

FIG. 16B illustrates an example of the data structure when secret information is sealed using a plurality of PCRs as conditions. Sealed data 1203 is encoded secret information, and data 1204 represents a plurality of PCR numbers and their values. In response to the unseal request of the sealed data 1203, the software TPM 107 unseals the sealed data 1203 only when the $PCR_{100}$ value and $PCR_{101}$ value of the data 1204 and the current virtual $PCR_{100}$ value and $PCR_{101}$ value match.

Unseal of Secret Information

Figure 17:
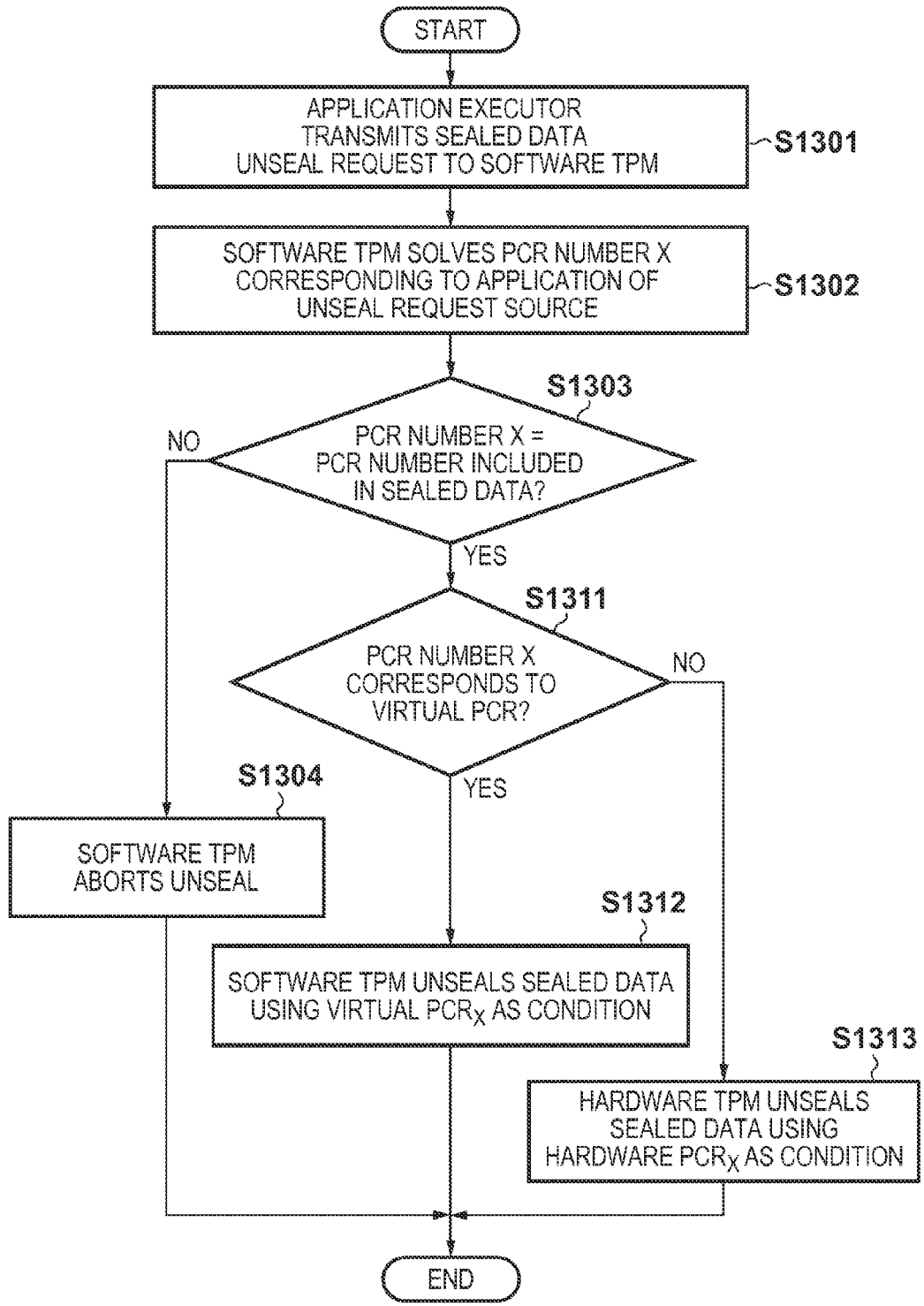
FIG. 17 is a flowchart for explaining secret information unseal processing.

Secret information unseal processing will be described with reference to the flowchart of FIG. 17. Note that the processing shown in FIG. 17 corresponds to the processes of steps S1003, S1013, and S1023 in FIGS. 8A to 8C. The processes of steps S1301 to S1304 are the same as those shown in FIG. 10, and a detailed description thereof will be omitted.

Upon determining in step S1303 that the PCR number X matches the PCR number included in the sealed data, the software TPM 107 determines whether $PCR_X$ is a virtual PCR (S1311).

If $PCR_X$ is a virtual PCR, the software TPM 107 causes the encoder 905 using the private key of the key pair memory 906 to decode (unseal) the sealed data using the virtual $PCR_X$ as a condition (S1312).

On the other hand, if $PCR_X$ is a hardware PCR, the software TPM 107 causes the hardware TPM 102 to unseal the sealed data via the hardware TPM controller 904. That is, the sealed data is decoded (unsealed) by the private key of the hardware TPM 102 using the virtual $PCR_X$ as a condition (S1313).

When the plurality of PCRs of the sealed data 1203 shown in FIG. 16B include hardware PCRs, the software TPM 107 load the hardware PCR values and performs the determination (S1311) and unseal (S1312). However, if all of the plurality of PCRs are hardware PCRs, the hardware TPM 102 performs unseal (S1313).

As described above, even when the number of hardware PCRs is smaller than the number of activated applications, seal of secret information and unseal of sealed data can appropriately be performed.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-188926 filed Aug. 29, 2012 which is hereby incorporated by reference herein in its entirety.

What is claimed is:

1. An information processing apparatus comprising:
a memory storing code; and
a processor, wherein upon execution of the stored code the processor functions as
  a trusted device which has a plurality of registers and performs data protection by encryption of data associated with a value of one of the plurality of registers;
  a management unit that, for each application, manages an association between the respective application and a first register number used by that application for performing the data protection;
  an application execution unit that, during execution of an application, issues a data protection request that designates a second register number preset in the application; and
  a protection unit that, when a data protection request is issued for an application, (i) obtains the first register number that is associated with that application, (ii) replaces, in the data protection request, the second register number that is preset in the application with the first register number that is associated with the application, and (iii) transfers to the trusted device the data protection request in which the second register number has been replaced with the first register number.

2. The apparatus according to claim 1, further comprising a loading unit configured to load the application to a memory of the information processing apparatus in accordance with a user instruction, and to acquire the first register number corresponding to the application from the management unit.

3. The apparatus according to claim 2, wherein in a case where the register indicated by the first register number has an initial value, the loading unit issues, to the protection unit, a registration request of a hash value of the application that designates the first register number.

4. The apparatus according to claim 3, wherein the protection unit transfers the registration request of the hash value to the trusted device.

5. The apparatus according to claim 3, wherein in a case where the value of the register indicated by the first register number is different from the initial value, the loading unit controls activation of the application based on comparison between the hash value and the value of the register.

6. The apparatus according to claim 5, wherein in a case where the hash value matches the value of the register, the loading unit activates the application, and in the case where the hash value does not match the value of the register, the loading unit aborts activation of the application.

7. The apparatus according to claim 1, wherein the protection unit comprises a plurality of registers independently of the trusted device.

8. The apparatus according to claim 7, wherein in a case where the first register number of the application managed by the management unit falls outside a range of the plurality of registers comprised in the trusted device, the protection unit executes the requested data protection in association with a value of one of the plurality of registers of the protection unit.

9. The apparatus according to claim 8, wherein during execution of the application, the application execution unit issues a release request of data that has undergone the data protection.

10. The apparatus according to claim 9, wherein in a case where a register value of the second register number included in the data that has undergone the data protection matches the value of the register corresponding to the first register number, either the trusted device or the protection unit releases the data protection of the protected data.

11. The apparatus according to claim 8, wherein a key used by the protection unit for the data protection is protected by the trusted device.

12. The apparatus according to claim 1, wherein the management unit manages the first register number associated with at least one of a file path of an application, a hash value, user rights, or a uniform resource locator.

13. A control method of an information processing apparatus having a trusted device which has a plurality of registers and performs data protection by encryption of data associated with a value of one of the plurality of registers, the method comprising:
using a processor to perform the steps of:
  managing, for each application, an association between the respective application and a first register number used by that application for performing the data protection;
  issuing, during execution of an application, a data protection request that designates a second register number preset in the application; and
  when a data protection request is issued for an application, (i) obtaining the first register number that is associated with that application, (ii) replacing, in the data protection request, the second register number that is preset in the application with the first register number that is associated with the application, and (iii) transferring, to the trusted device, the data protection request in which the second register number has been replaced with the first register number.

14. A non-transitory computer readable medium storing a computer-executable program for causing a computer to perform a control method of an information processing apparatus having a trusted device which has a plurality of registers and performs data protection by encryption of data associated with a value of one of the plurality of registers, the method comprising:
using a processor to perform the steps of:
  managing, for each application, an association between the respective application and a first register number used by that application for performing the data protection;
  issuing, during execution of an application, a data protection request that designates a second register number preset in the application; and
  when a data protection request is issued for an application, (i) obtaining the first register number that is associated with that application, (ii) replacing, in the data protection request, the second register number that is preset in the application with the first register number that is associated with the application, and (iii) transferring, to the trusted device, the data protection request in which the second register number has been replaced with the first register number.

* * * * *